(12) United States Patent
Boschker et al.

(10) Patent No.: US 8,855,930 B2
(45) Date of Patent: Oct. 7, 2014

(54) METHOD OF GENERATING A ROUTE

(75) Inventors: Breght Roderick Boschker, Hilversum (NL); Henk Van Der Molen, 's-Hertogenbosch (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 13/640,083

(22) PCT Filed: Sep. 16, 2010

(86) PCT No.: PCT/EP2010/063600
§ 371 (c)(1),
(2), (4) Date: Dec. 10, 2012

(87) PCT Pub. No.: WO2011/124271
PCT Pub. Date: Oct. 13, 2011

(65) Prior Publication Data
US 2013/0204526 A1    Aug. 8, 2013

Related U.S. Application Data

(60) Provisional application No. 61/322,325, filed on Apr. 9, 2010.

(51) Int. Cl.
*G01C 21/34* (2006.01)
*G06F 19/00* (2011.01)

(52) U.S. Cl.
USPC ..................... 701/533; 340/995.19

(58) Field of Classification Search
USPC ................ 701/533, 428, 431, 420, 423, 426; 340/995.19, 995.24
See application file for complete search history.

(56) References Cited

U.S. PATENT DOCUMENTS

| | | | | |
|---|---|---|---|---|
| 6,021,372 | A * | 2/2000 | Harrington | 701/533 |
| 6,098,015 | A * | 8/2000 | Nimura et al. | 701/428 |
| 6,542,812 | B1 * | 4/2003 | Obradovich et al. | 701/426 |
| 6,622,087 | B2 * | 9/2003 | Anderson | 701/423 |
| 7,512,487 | B1 | 3/2009 | Golding et al. | |
| 8,082,186 | B2 * | 12/2011 | Shuchman et al. | 705/26.5 |
| 8,504,285 | B2 * | 8/2013 | Vepsalainen | 701/410 |
| 2002/0082771 | A1 | 6/2002 | Anderson | |
| 2007/0005240 | A1 | 1/2007 | Oumi et al. | |

FOREIGN PATENT DOCUMENTS

| | | |
|---|---|---|
| EP | 1265206 A2 | 12/2002 |
| WO | 2006033560 A1 | 3/2006 |
| WO | 2009053792 A2 | 4/2009 |

OTHER PUBLICATIONS

International Search Report issued Feb. 1, 2011 for International Application No. PCT/EP2010/063600.

* cited by examiner

*Primary Examiner* — Tan Q Nguyen

(57) ABSTRACT

A method of generating a route across an electronic map representative of an area, the method comprising using a processing circuitry 302 to generate a set of cost functions 607 associated with at least one route planning profiles 602 and comprising the steps of: ) collecting information relating to at least one example route associated with the at least one route planning profile 607; 2) processing, with a cost function generating process 716, the information relating to the at least one example route to generate one or more cost functions 607 to be used with the at least one route planning profile 607; and 3) using the or each cost function 607 to generate a route across the electronic map for that route planning profile 602.

9 Claims, 8 Drawing Sheets

|  | Car Fastest | Car ECO | Car Scenic | Bike Fastest | Bike Shortest | Bike Fun | Truck Fastest | Truck Eco | Delivery Truck | Walking | Taxi Driver |
|---|---|---|---|---|---|---|---|---|---|---|---|
| Road curvature | -- | -- | + |  | + | ++ | -- | -- | -- |  | -- |
| U-Turns | -- |  | - | -- | -- | -- | -- | -- | -- |  | - |
| Left-Turns |  |  |  |  |  |  |  |  | -- |  |  |
| Slope changes | - | - | + | + | + | + | - | -- | -- |  |  |
| Urban areas |  |  | -- |  |  | - | - | - | + |  | ++ |
| Rural Areas | -- |  | ++ | + | + | ++ | - | - | - | + | - |
| City Centers | - |  | - |  |  |  | - | - | - | + | + |
| Highways | ++ | + | - | ++ | + |  | ++ | + | - | -- |  |
| Major roads | + | ++ | + | ++ | ++ | ++ | + | + | + | -- |  |
| Unpaved roads | -- | -- | - | -- | -- | -- | -- | -- | -- |  | -- |
| Ferries |  | + | + |  |  | + |  | + |  | + |  |
| Toll Roads |  | - |  |  | - | - |  |  |  | -- | - |
| Speed 0-30 km/h | -- | - |  |  | -- |  | -- | -- |  | + | ++ |
| Speed 30-60 km/h | - |  | + | - |  | + | - |  |  |  | - |
| Speed 60-80 km/h |  | ++ |  | + |  |  |  | ++ | | |  | -- |
| Speed 80-100 km/h | + | ++ | - | ++ |  |  |  | - | -- | -- | -- |
| Speed 100+ km/h | ++ | - | -- | ++ |  |  |  | -- | -- | -- |  |

*Fig. 6*

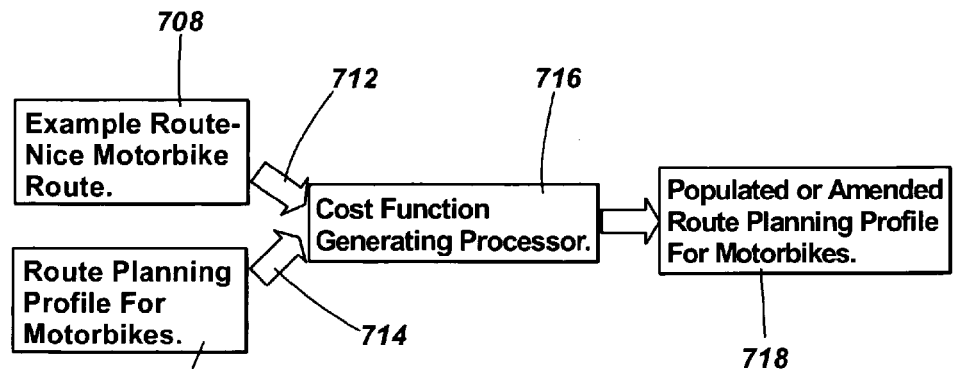

*Fig. 7*

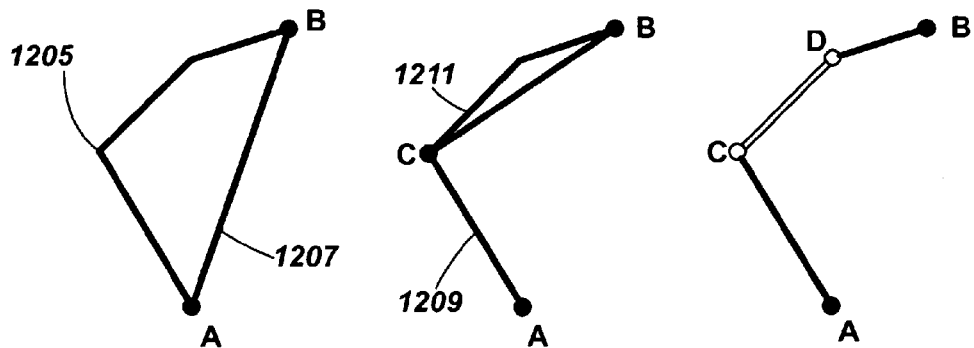
*Fig. 12A*  *Fig. 12B*  *Fig. 12C*
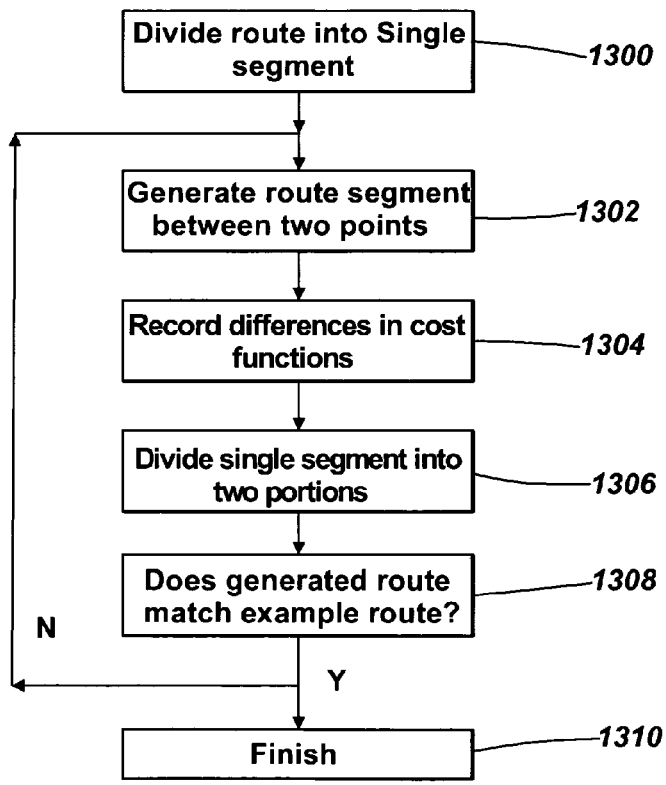
*Fig. 13*

METHOD OF GENERATING A ROUTE

CROSS-REFERENCES TO RELATED APPLICATIONS

This application is the National Stage of International Application No. PCT/EP2010/063600, filed Sep. 16, 2010 and designating the United States. The application claims the benefit of U.S. Provisional Application No. 61/322,325 filed Apr. 9, 2010. The entire contents of both these applications are incorporated herein by reference.

FIELD OF THE INVENTION

This invention relates to a method of generating a route, which in particular may relate to generating one or more cost functions arranged to be used with a route planning profile and apparatus that may be associated with this method including navigation devices, servers and machine readable mediums. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and may be also navigation, functionality.

BACKGROUND TO THE INVENTION

Portable navigation devices (PNDs) that include GPS (Global Positioning System) signal reception and processing functionality are well known and are widely employed as in-car or other vehicle navigation systems. Such PND's are a subset of Navigation devices in general and it is convenient to describe such PND's.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In some embodiments, the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including position data, can be received and subsequently processed to determine a current location of the device.

The PND devices which generate information and these devices may also include electronic gyroscopes and accelerometers which produce signals (ie information) that can be processed to determine the current angular and linear acceleration, and in turn, and in conjunction with position information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m"

requires significant processing and analysis. As previously mentioned, user interaction with the device may be by a touch screen, or additionally or alternately by steering column mounted remote control, by voice activation or by any other suitable method.

A further function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads), or any other suitable criteria.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

As will be apparent from the above, by using real time monitoring, historical road network data and user preference inputs current POI's are capable of adaptability in the sense that a route may be generated and/or altered to suit a particular situation. It is also known for individuals to manually create routes that may be considered high in desirable features for their special interest or journey priorities.

SUMMARY OF THE INVENTION

According to a first aspect of the invention there is provided a method of generating a route across an electronic map representative of an area, the method comprising using a processing circuitry to generate a set of cost functions associated with at least one route planning profile and comprising the steps of:

1) collecting information relating to at least one example route associated with the at least one route planning profile;
2) processing, with a cost function generating process, the information relating to the at least one example route to generate one or more cost functions to be used with the at least one route planning profile; and
3) using the or each cost function to generate a route across the electronic map for that route planning profile.

By utilising this method cost functions may be tailored for a particular route planning profile so that routes planned utilising said route planning profile are better suited to an intended use for the route generated by the method. Example routes which may be created manually by or for users using a particular route planning profile, trace information on routes travelled by users known or believed to use that route planning profile and/or user feedback as to the suitability of an example route for the route planning profile may be used.

In this manner, the skilled person will appreciate that the method creates (ie determines) the set of cost functions (which may indeed be a single cost function) from the information of the example route. The cost function may not be known beforehand; ie it may not be known what makes an example route particularly suitable for a given route planning profile.

Conveniently, the method may comprise generating cost functions for at least some, and generally each, of a plurality of route planning profiles. In this way a user may be able to select routes to be generated from a plurality of different style routes.

In some embodiments the step of generating the cost functions includes re-generating the cost function where it has been previously generated. In this case generating of the cost function may comprise making one or more iterative adjustments to the cost function as a consequence of the one or more example routes.

By allowing for the cost function generating process to adjust/update the cost functions already generated the size of the example route sample is increased. In this way the route planning profile may be made a more reliable tool for use in planning a route for a given route planning profile. Weighting of additional example routes may mean that no individual route is given undue significance; ie the so determine cost functions may become more representative of the route planning profile.

The route planning profile refers to an identifiable sub-set of possible journey types, where in view of the nature of the journey type certain features that may occur on a route travelled in order to complete the journey vary in their desirability. It is apparent that different users will have different priorities depending on the nature of the journey type to be undertaken. Route planning profiles may therefore be applicable to an identifiable group of users who will likely have similar priorities in view of them undertaking similar journey types.

It will be appreciated that route planning profiles may be fairly broad in nature or may be very specific. Where route planning profiles are specific the degree of tailoring in accordance with the particular requirements of users belonging to that route planning profile may be higher.

In some embodiments the route planning profile may therefore refer to a particular user type, vehicle type, journey purpose type, weather type, miscellaneous requirement such as shortest distance, fastest route or minimum cost or any other suitable identifiable type that may be applied to a journey.

Example route planning profiles might include: fastest; car fastest; most economic; car most economic; scenic; bike fastest; bike shortest; bike fun; fun; truck fastest; truck most economic; delivery truck; walking; commuter; taxi driver; delivery driver; holiday, motorcyclist, speed and cost, and the like.

It will be appreciated that many of the priorities of users for which different use categories would be relevant may overlap, but that the peculiarities of a journey type to be undertaken may also result in priority emphasise shifts or complete priority changes.

In some embodiments, prior to the step of generating the cost functions, a series of features that may be encountered on a journey are entered. When the cost functions are generated, one or more of the features is assigned an individual cost function, where the value of the individual cost function corresponds to the desirability of that feature for the identified route planning profile. In this way the route planning profile may be thought of as comprising an information resource detailing the desirability of certain journey features for that particular route planning profile.

Example features might include: tight bends, U-turns, gradient variation, city centres, scenic roads, traffic lights, motorways; road surface condition, road curvature; u-turns; left-turns; right-turns; slope changes; rural areas; highways; major roads; unpaved roads; ferries; toll roads; speed limits (for example 30 km/h; 30-60 km/h; 60-80 km/h; 80-100 km/h; and 100+ km/h) and the like.

In some embodiments the cost function generating process assumes or can accept confirmation that one or more of the example routes provided have a predominance of desirable features for the identified route planning profile. In this way, when generating the cost functions, the cost function generating process may operate according to the principal that features present in the example route in question are desirable for that route planning profile. The prevalence of each feature present may also be accounted for in generating the cost functions.

In some embodiments the cost function generating process assumes or can accept confirmation that one or more of the example routes provided has a predominance of undesirable features for the identified route planning profile. In this way, when generating the cost functions, the cost function generating process may operate according to the principal that features present in the example route in question are undesirable for that route planning profile. The prevalence of each feature present may also be accounted for in generating the cost functions.

In some embodiments the cost function generating process assumes or can accept confirmation that one or more of the example routes provided have a predominance of features that are neither desirable nor undesirable for the identified route planning profile. In this way, when generating the cost functions, the cost function generating process may operate according to the principal that features present in the example route in question are neither desirable nor undesirable for that route planning profile. The prevalence of each feature present may also be accounted for in generating the cost functions.

In some embodiments, the cost function may take the form of a discrete variable which may be assigned a value according to the presence (and/or may be the absence) of predetermined features within the example route. For example, the discrete variable may have 1, 2, 3, 4, 5, 6, 7, 10, or more values.

In some embodiments the cost function values may be continuous. In this way a high degree of detail may be provided in the route planning profile such that small differences in feature desirability may be identified.

In some embodiments the route planning profile is used as an input to a route planning process to generate a route on an electronic map. It may be for example that the route planning process has a default capability to generate a route prioritising minimum journey time and/or distance and/or cost. The route planning profile may then be considered to provide additional factors (exceptions) to influence route generation performed by the route planning process.

In some embodiments the cost function generating process and route planning process are provided by the same processing circuitry.

In some embodiments the route planning process uses a heuristic search process. This may be particularly beneficial where it is desirable that routes can be generated quickly.

In some embodiments at least one of the example routes is created by a user on an electronic map. Thus the user may for example manually input waypoints or draw, or otherwise mark, on the electronic map (may be using a touch screen or other input device such as a mouse, tablet, or the like). In this way a user may create an example route that he/she knows to have a predominance of desirable features for a particular route planning profile. Equally of course the user could create an example route that he/she knows to have a predominance of undesirable features for a particular route planning profile, and this may still be used to usefully generate cost functions for a given route planning profile.

In some embodiments at least one of the example routes is created by recording a route taken while it is travelled. Thus a user may for example travel a route whilst being tracked by GPS (or other such position data generating system) or whilst a passenger records the route.

In some embodiments at least one of the example routes is created by a route planning process, reviewed by a user, who indicates its desirability or otherwise for the route planning profile. Such user review may allow the cost function generation process to generate the cost functions for route generated by the route planning process.

Additionally, or alternatively, the user may indicate the degree of desirability of the route. For example, a user may be asked to rank a route that has been travelled. Such user feedback may subsequently be used to generate a route planning profile using the travelled route as an example route.

The method may allow a user to assign a route planning profile to a route, whether generated by a route planning process, travelled, created, or the like. Such a method may then allow such a route to be used as an example route as an input to the method.

In some embodiments, especially where there are multiple contributors (ie users) of example routes, the example routes are uploaded to a collection point. Example routes uploaded to the collection point may be used by processing circuitry (eg a server) providing the cost function generating process to generate the set of cost functions of the route planning profile. In this way individual users may contribute to a route planning profile available to all users with their own example routes. The route planning profile might then be distributed to users who may benefit from that route planning profile via special interest groups or another centralised distribution point. Nonetheless it should be noted that collected example routes need not be processed centrally in order that a cost function can be generated for a route planning profile.

In some embodiments a user identifies an example route that he/she has created or will create as being applicable to a route planning profile. Route planning identification may therefore occur by the user where he/she has, or will, travel and record a route to be used as an example route for the route planning profile.

In some embodiments the route planning profile is identified by a user prior to the generation of a route on an electronic map so as the route planning process selects the route planning profile in planning a route for that user. Therefore in contrast to identification of a route planning profile to which an example route is relevant, the user may also identify a particular route planning profile which he/she wishes for a route to be calculated with that will suit a corresponding journey type. As such, a user may vary the route planning profile that is used for each journey allowing the characteristics of the planned route to be varied for a given journey.

In some embodiments a navigation device records the route while it is travelled which route can subsequently be used as an example route for the generation of the cost functions for a route planning profile. The navigation device may be a convenient way of tracking and recording the example route.

In some embodiments a navigation device displays routes generated by the route planning process. This may facilitate ease of navigation for the user.

In some embodiments the route planning profile is identified according to explicit identification by the user as belonging to that route planning profile. Such identification may be useful where an example route is to be provided by the user/navigation device and/or where a route is to be generated for that user. Explicit identification may be the most reliable method and may therefore result in more useful route planning profiles and/or better tailored routes.

In some embodiments such explicit identification is performed by making a selection on a navigation device. This may be convenient for the user in particular.

In alternative, or additional, embodiments, sensed information (ie information derived from positioning data, or information derived therefrom) may be used to assign an example route to a route planning profile. Examples of sensed information include: Driving style (e.g. cornering speed), route taken, time of day, day and/or duration of journey, start and end points etc.

In some embodiments, at least some of the steps of the method are performed by a navigation device. In this case one or more of the example route(s) provided to the cost function generating process may be travelled by a user of the navigation device which records the example route(s). This may allow the user to 'teach' one or more route planning profiles that he/she may use. In this way there is no requirement that the navigation device be linked to a network or any other source of information in order that example routes are provided for generating the cost function associated with a route planning profile. This does not preclude the navigation device from being networked.

For the purpose of recording the example routes the navigation device may have a passive "learning" mode. In this way the navigation device may be configured to record an example route, rather than displaying a suggested route. In the passive mode the navigation device may have other features (e.g. display image, illumination and verbal advice) deactivated or modified as appropriate.

In some embodiments more than one route planning profile is provided on the navigation device. This may allow example routes to be used to generate cost functions for more than one route planning profile and/or for the user to choose between route planning profiles when an example route is to be travelled.

In some embodiments some or all the example route(s) provided to the cost function generating process are downloaded to the navigation device. In this way the responsibility for creating example routes may be partially or completely removed from a user thereof. Nonetheless the presence of the cost function generating process on the navigation device may mean that generation of a cost function associated with a route planning profile still occurs on the navigation device.

In some embodiments the navigation device is provided with a route planning profile for which the cost functions have been generated. The route planning profile may for example be downloaded or uploaded to the navigation device. Such an embodiment may allow the navigation device to simply use a generated cost function rather than having to generate it thereby reducing the processing burden on the navigation device.

In some embodiments the navigation device is provided with more than one route planning profile for which cost functions have been generated. This may allow a user to select a route planning profile to teach and/or to use for the generation of a particular route.

In some embodiments the cost function generating process may be arranged to generate cost functions by performing at least one of the following steps:
4) Characterising the example route(s) as a set of features;
5) Comparing the set of features to those in the route planning profile for which the cost function is being generated; and
6) Generating the cost function for the route planning profile with cost functions in view of the features present in the example route.

This may be a relatively simple route planning profile populating process and so may require relatively little computing power, storage capacity and/or time.

In some embodiments generation of the cost functions is based not only on the features present in the example route but also on the prevalence of those features in the example route.

Where the cost functions have already been generated and the example route is being used to adjust the cost functions, the new information provided by the example route may be weighted in accordance with the number of example routes that have previously been used to generate cost functions for the route planning profile. Weighting of example routes may mean that no individual route is given undue significance.

In some alternative embodiments the cost function is for a route planning profile in combination with the route planning process by any one or more of the following processes:
1) Map the example route on an electronic map.
2) Define one or more segments of route between the start and end points of the route.
3) Plan a route for each segment utilising the route planning profile for which cost functions are to be generated.
4) If the planned route segment matches a corresponding segment of the example route to within a predefined tolerance, this segment is ignored and the next segment is analysed starting with step 4 until all segments have been analysed.
5) If the planned route segment does not match a corresponding segment to within the predefined tolerance of the example route, either
a) Find the main differences in features of the example route segment and the planned route segment and represent these as differences in cost functions between the route planning profile for which cost functions are to be generated and a constructed route planning profile for the example route segment and record the differences between the cost functions, or b) Alter the cost functions of the route planning profile for which cost functions are to generated until it will plan a route segment matching the example route segment to within the predefined tolerance and record the alterations to the cost functions that were required.

6) Split the segment into two new segments and repeat from step 5 until the planned route segment matches to within the predefined tolerance the example route segment.

7) Analyse all recorded differences and adjust the cost functions associated with features in the route planning profile for which cost functions are to be generated.

Depending on the predefined tolerance used this method of route planning profile population may provide detailed analysis of the example route to increase the accuracy of the generated cost functions.

In some embodiments weighting of the recorded differences may be performed according to the length of the segment so as to take account of its significance.

In some embodiments neural nets, genetic algorithms or other relaxation algorithms are used to adjust cost functions associated with the route planning profile. This may be particularly useful where for example the cost function generating process assumes or can accept confirmation that one or more of the example routes provided has a predominance of features that are desirable, undesirable or neither for the identified route planning profile. It will be appreciated that in this situation that example routes will often have some features that do not fit the trend of being desirable, undesirable or neither. In this case through the analysis of multiple example routes a relaxation algorithm may establish features that are truly desirable and those which are not.

The electronic map may comprise a plurality of navigable segments, each navigable segment representing a segment of a navigable route in the area covered by the map.

According to a second aspect of the invention there is provided a processing circuitry arranged to generate a route across an electronic map representative of an area, the processing circuitry being arranged to:

1) have input thereto information relating to at least one example route associated with at least one route planning profile;
2) process, with a cost function generating process, the information relating to the example route to generate one or more cost functions to be used with the at least one route planning profile; and
3) using the or each cost function to generate a route across the electronic map for that route planning profile.

According to a third aspect of the invention there is provided a processing circuitry arranged to generate at least one set of cost functions to be used in the generation of a route across an electronic map wherein the route is generated for a predetermined route planning profile and the processing circuitry is arranged to:

1) receive information relating to at least one example route associated with the at least one route planning profile;
2) process, with a cost function generating process, the information relating to the at least one example route to generate one or more cost functions to be used with the at least one route planning profile; and
3) storing the generated set of cost functions.

The skilled person will appreciate that the example route may be received from external to the processing circuitry, such as via a network connection thereto, or may be received from within storage associated with the processing circuitry such as a memory, hard drive, hard drive array, etc.

According to a fourth aspect of the invention a navigation device arranged to use a route planning profile comprising a set of route planning profiles at least some, and generally each, having associated therewith one or more cost functions.

According to a fifth aspect of the invention there is provided a machine readable medium containing instructions which when read onto a machine cause that machine to perform the method of the first aspect of the invention.

According to a sixth aspect of the invention there is provided a machine readable medium containing instructions which when read onto a machine cause that machine to perform as the processing circuitry of the second aspect of the invention.

According to a seventh aspect of the invention there is provided a machine readable medium containing instructions which when read onto a machine cause that machine to perform as the processing circuitry according to the third aspect of the invention.

According to an eighth aspect of the invention there is provided a machine readable medium containing instructions which when read onto a machine cause that machine to perform as the navigation device according to the fourth aspect of the invention.

According to a ninth aspect of the invention there is provided a machine readable medium containing instructions which provide an electronic map having associated therewith a set of route planning profiles at least some, and generally each, having associated therewith one or more cost functions.

In any of the above aspects of the invention the machine readable medium may comprise any of the following: a floppy disk, a CD ROM, a DVD ROM/RAM (including a −R/−RW and +R/+RW), a hard drive, a memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

The skilled person will appreciate ideas introduced in relation to any one of the above aspects of the invention may be applied, mutatis mutandis, to any of the other aspects of the invention.

BRIEF DESCRIPTION OF THE DRAWINGS

Various aspects of the teachings of embodiments of the present invention, and arrangements embodying those teachings, will hereafter be described by way of illustrative example with reference to the accompanying drawings, in which:

FIG. 6 is a table showing several examples of a route planning profile according to an embodiment of the invention;

FIG. 7 is a block diagram showing the principal of populating a route planning profile according to an embodiment of the invention;

FIG. 12 is illustrative of one method in which a route planning process may be used to generate cost functions for a route planning profile; and FIG. 13 outlines a flow chart highlighting the method described in relation to FIG. 12.

DETAILED DESCRIPTION OF EMBODIMENTS OF THE PRESENT INVENTION

Embodiments of the present invention will now be described with particular reference to a Portable Navigation Device (PND). It should be remembered, however, that the teachings of the present invention are not limited to PNDs but are instead universally applicable to any type of processing device, or processing circuitry, that will generally be configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing device (such as a desktop or portable personal computer (PC), mobile telephone or portable digital assistant (PDA)) which may execute route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
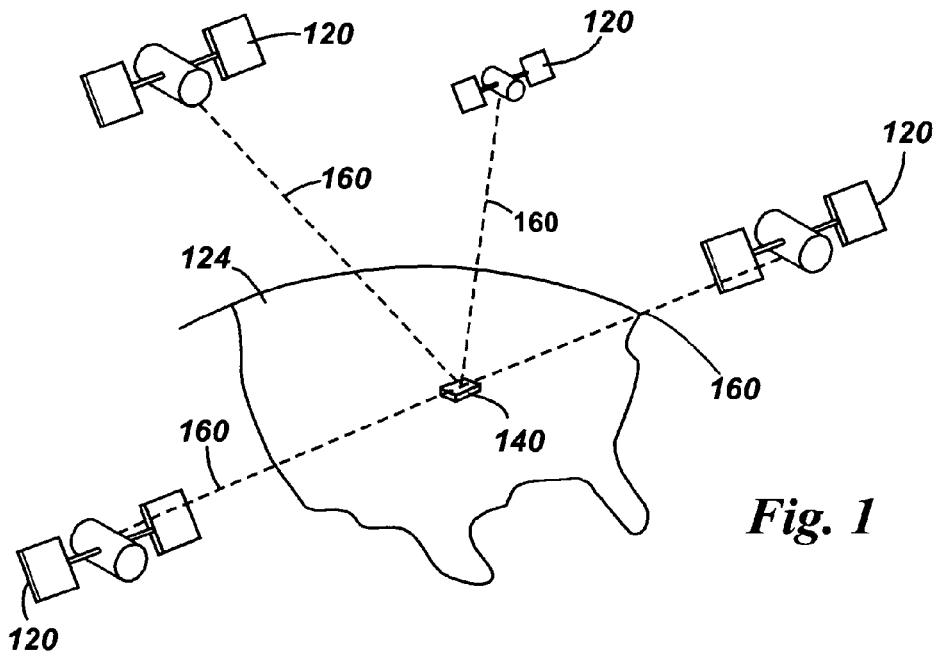
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in precise orbits. Based on these precise orbits, GPS satellites can relay their location to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize an accurate frequency standard accomplished with an accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner. The GPS receiver 140 may be arranged to perform such a location finding exercise from time-to-time in order to build up a route along which it has travelled. Thus the GPS derived position may be thought of as position data; ie is provides a position for the GPS receiver 140.

Figure 2:
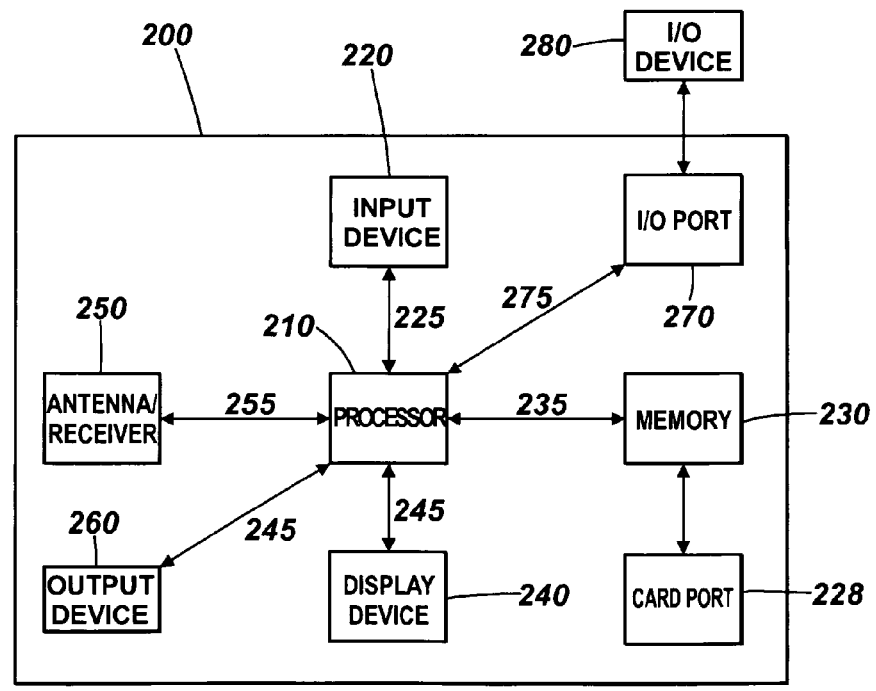
FIG. 2 is a schematic illustration of electronic components arranged to provide a navigation device.

FIG. 2 is an illustrative representation of electronic components of a navigation device 200 according to an embodiment of the present invention, in block component format. It should be noted that the block diagram of the navigation device 200 is not inclusive of all components of the navigation device, but is only representative of many example components.

The navigation device 200 is located within a housing (not shown). The housing includes processing circuitry which in the embodiment being described is provided by a processor 210 connected to an input device 220 and a display screen 240, the display screen providing one example of an output device. The input device 220 can include a keyboard device, voice input device, touch panel and/or any other known input device utilised to input information; and the display screen 240 can include any type of display screen such as an LCD display, for example. In one embodiment the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include other examples of an output device such as an audible output device (e.g. a loudspeaker). Whilst a loudspeaker 260 can produce audible information for a user of the navigation device 200, it should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and loudspeaker 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The memory resource also comprises a port 228, which communicates with the processor 210 via connection 235, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
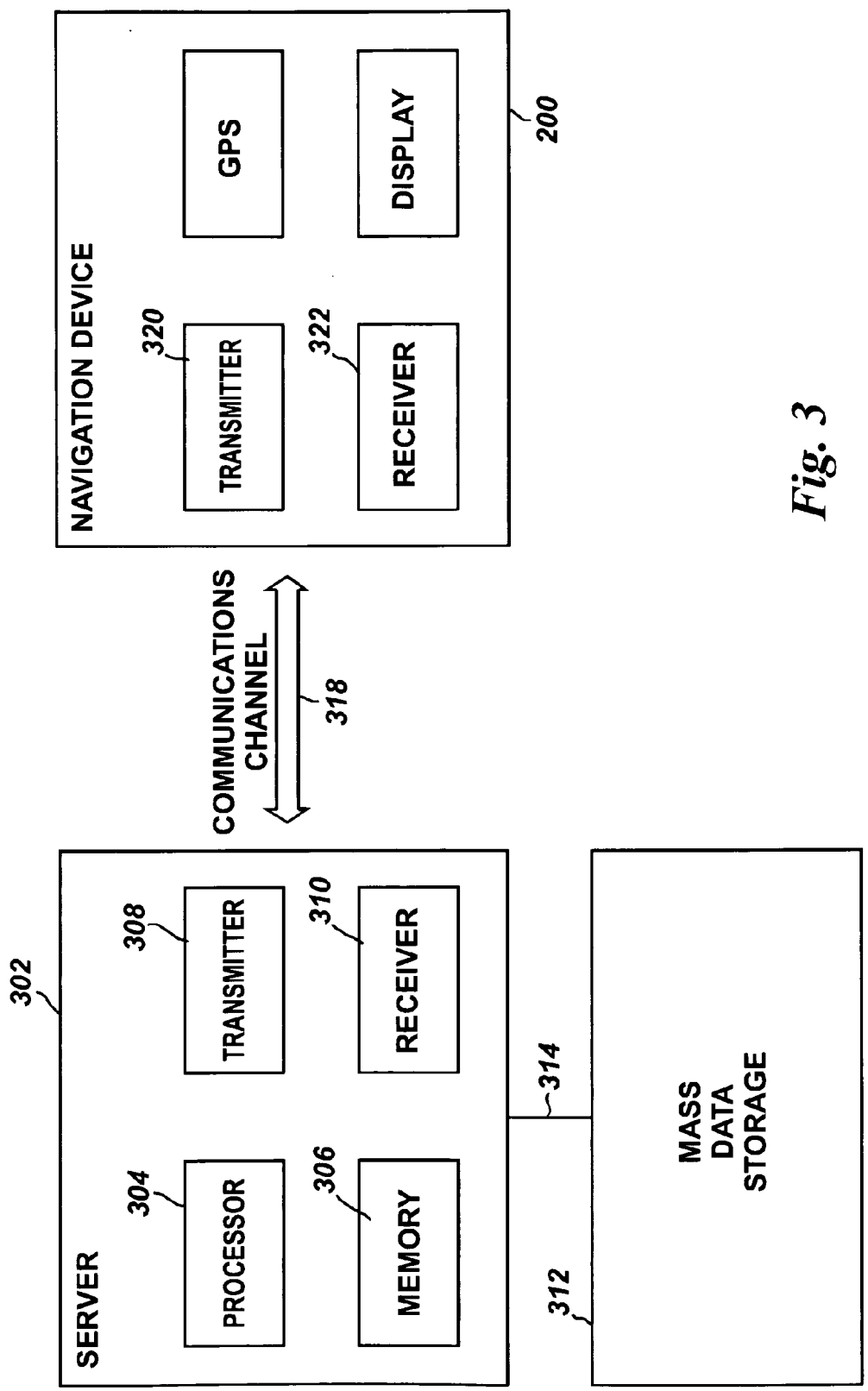
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302 (The server may of course be thought as a processing circuitry). As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS connection (General Packet Radio Service), a UMTS (Universal Mobile Telephone System)—or other 3G connection. (GPRS and UMTS connections provide a high-speed data connection for mobile devices provided by telecom operators; GPRS and UMTS each provide methods to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

In some embodiments of the present invention the server 302 may provide at least one of a cost function generating process and a route planning process.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be updated automatically from time to time, perhaps periodically, or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well-known to those of ordinary skill in the art. Further, the navigation device 200 can also include any additional input device 220 and/or any additional output device 241, such as audio input/output devices for example.

Figure 4A:
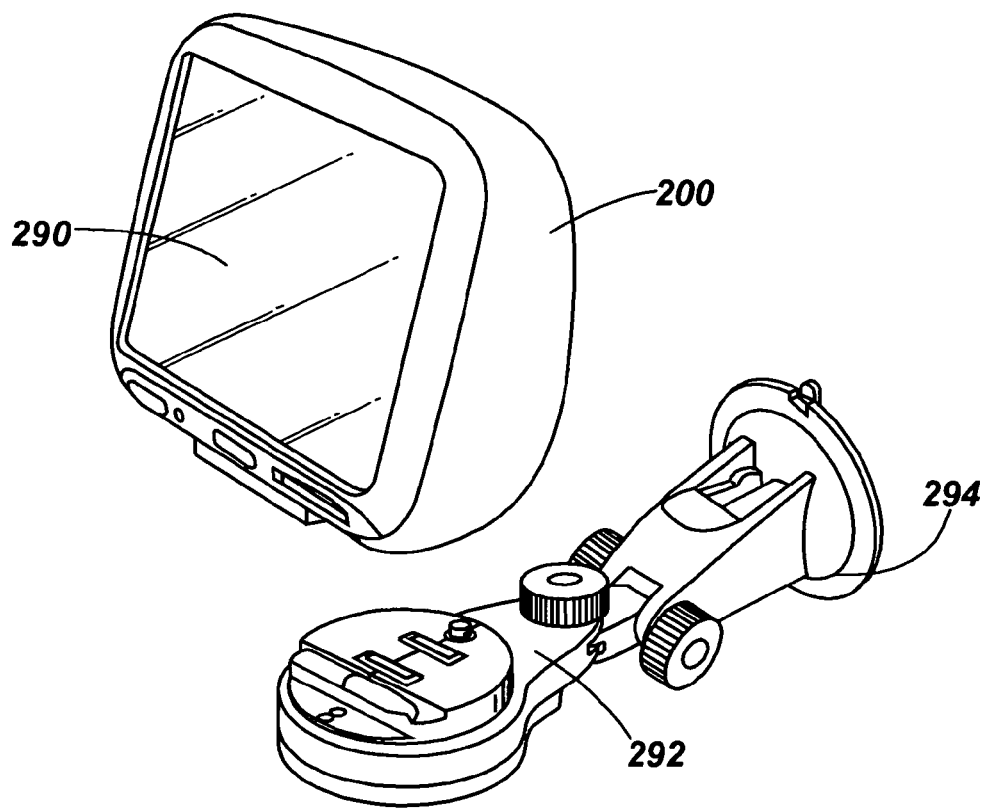
FIGS. 4A and 4B are illustrative perspective views of a navigation device.
Figure 4B:
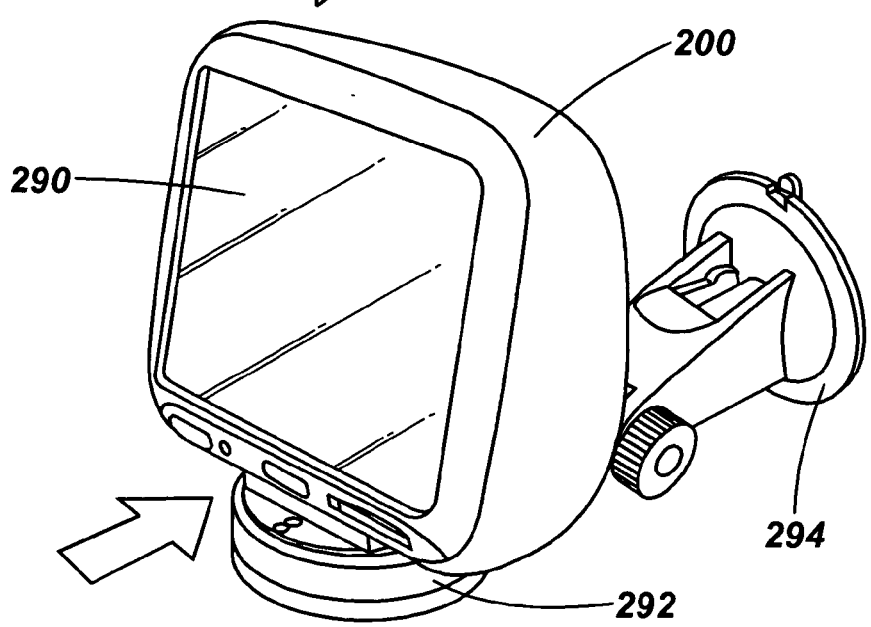

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 200 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
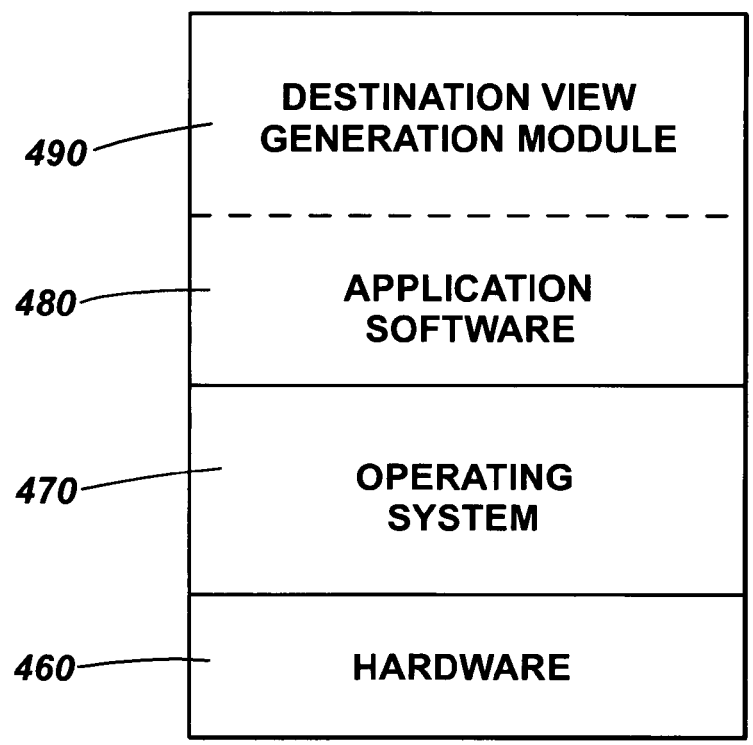
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith.

Adding to and expanding upon the technology discussed above, FIG. 6 shows a table containing several route planning profiles 602 for different types activity that a user may employ. Route planning profiles 602 are identifiable sub-sets of possible journey types, where in view of the nature of the journey type, certain features 604 are indicated as being more or less desirable than other features. Each route planning profile therefore identifies a journey type to which certain journeys may be considered to belong and for which the priorities of users undertaking those journeys may be considered to be at least similar or the same.

Each route planning profile comprises a list of features 604 and areas 606 for indicating the desirability of each feature 604 for that route planning profile 602. The area 606 holds a cost function 607 which has been generated and is indicative of the desirability of that feature for a given route planning profile (ie for a particular journey type). In the case of FIG. 6, the cost function system is a five point scale whereby very desirable features are awarded a ++, desirable features a +, features that are neither desirable nor undesirable are awarded a blank, undesirable features are awarded a – and very undesirable features are awarded a – –. As such it will be seen that such an embodiment provides a discreet value set for representing the cost functions. Other embodiments may provide a continuous value to represent the cost functions.

It will be appreciated that the route planning profiles 602, features 604 and cost function system shown in FIG. 6 are rather crude and intended as simplistic examples only. It will be appreciated for example that the route planning profiles 602 may be more specific to certain types of user, that a greater number and complexity of features 604 may be used and/or that the cost function system may have a finer gradation and extended range.

It will be appreciated that any of the route planning profiles of FIG. 6 could have cost functions 607 generated therefore based upon the opinions of an individual or group of individuals, especially where that individual of group may be considered to belong to or be at least associated with the route planning profiles 602 for which cost functions are to be generated. For example, bike riders may usefully be able to provide information in relation to route planning profiles related to riding a bike.

Alternatively, or additionally, however the route planning profile of FIG. 6 could have cost functions 607 generated therefore according to analysis of information associated with at least one example route considered relevant to that route planning profile. For example, a route generated by a GPS receiver 140 may be analysed as an example route to generate cost functions for a route planning profile. As such, a route generated by a GPS receiver 140 mounted on a bike may be used to generate a route planning profile associated with bikes, etc.

In the context of an example route, information may be taken to include at least the following: position data (which may be GPS or otherwise); data on segments of an electronic map which constitute the example route; speed (or velocity) information; acceleration information (including acceleration in any of three axis—linear, vertical, lateral); height information; curve radii; or the like.

FIG. 7 shows this latter principal schematically and through use of a specific example. An example route 708 considered to possess a predominance of desirable features for motorcyclists is provided. Additionally a route planning profile 710 that has been specifically assigned to a motorcycle route planning profile is provided. In this case (although not shown) the motorcycle planning profile 710 has not yet had cost functions 606 generated therefore. Both the example route 708 and the motorcycle planning profile 710 are input (at 712 and 714 respectively) to a cost function generating process 716. In this embodiment the process 716 assumes that the example route 708 has a predominance of desirable features for the identified route planning profile (in this case motorcyclists). The process 716 generates cost functions 606 for the motorcycle planning profile 710 according to the presence or otherwise, and in this case also the prevalence, in the example route 708, of features 604 listed in the motorcycle route planning profile 710. A motorcycle route planning profile having cost functions generated therefore is therefore output at step 718.

It will be appreciated that although in the FIG. 7 example the motorcycle route planning profile 710 did not contain generated cost functions 606 before input to the cost function generating process 716, on another occasion the motorcycle route planning profile 710 might contain previously generated cost functions 606. In that case, when the cost function generating process 716 generated the cost function(s) for the motorcycle route planning profile 710, it would be amending the cost functions 606 in view of the input example route 708. Typically the cost functions will be generated by a plurality of example routes 708.

In this embodiment, the cost function generating process 716 is provided on the server 300 and may be provided by the processor 304 thereof under instruction from instructions held in the memory 230 or elsewhere.

In some embodiments, the number of example routes used to generate a route planning profile may be allowed to increase. In other embodiments, the number of example routes used to generate a route planning profile may have an upper limit which when exceeded may cause the route planning profile to be sub-divided in order to provide users with further choice; ie route planning profiles which are perhaps more specific and targeted to his/her desires. In some embodiments, the upper limit may be a predetermined number. In other embodiments, the upper limit may vary according to the rate of change, or the like, of the cost-functions; ie the cost functions stop changing (or at least stop changing significantly) when further routes are analysed then the route planning profile may be subdivided.

It will also be appreciated that while in the example of FIG. 7 the cost function generating process 716 assumes that the example route 708 has a predominance of desirable features for the identified route planning profile (in this case motorcyclists), it may on other occasions be preferable that the cost function generating process 716 assumes that the example route 708 has a predominance of undesirable features or even features that are neither desirable nor undesirable, where this is more appropriate for the example route 708 to be used. It may even be that the cost function generating process 716 is arranged to receive confirmation as to whether the example route 708 input has a predominance of desirable or undesirable features, or neither of these.

The example routes used may (for example) be manually created by a user (especially where that user belongs to, is associated with, etc. the use associated with a route planning profile) or they may be the result of recording routes travelled (eg by the GPS receiver 140) or scrutinised by users identified as being associated with the route planning profile.

The utility of a route planning profile for which a cost function(s) has been generated is that it may allow for a route generated for a particular user to be tailored to his/her priorities. Where a user is identified as belonging to, or associated with, etc. a particular route planning profile for which cost functions have been generated, a route planning process can then utilise that route planning profile during generation of a route. By using raw data (example routes) to generate cost functions for the route planning profile, tailoring of route generation may become more objective and accurate (especially where multiple example routes are used).

Figure 8:
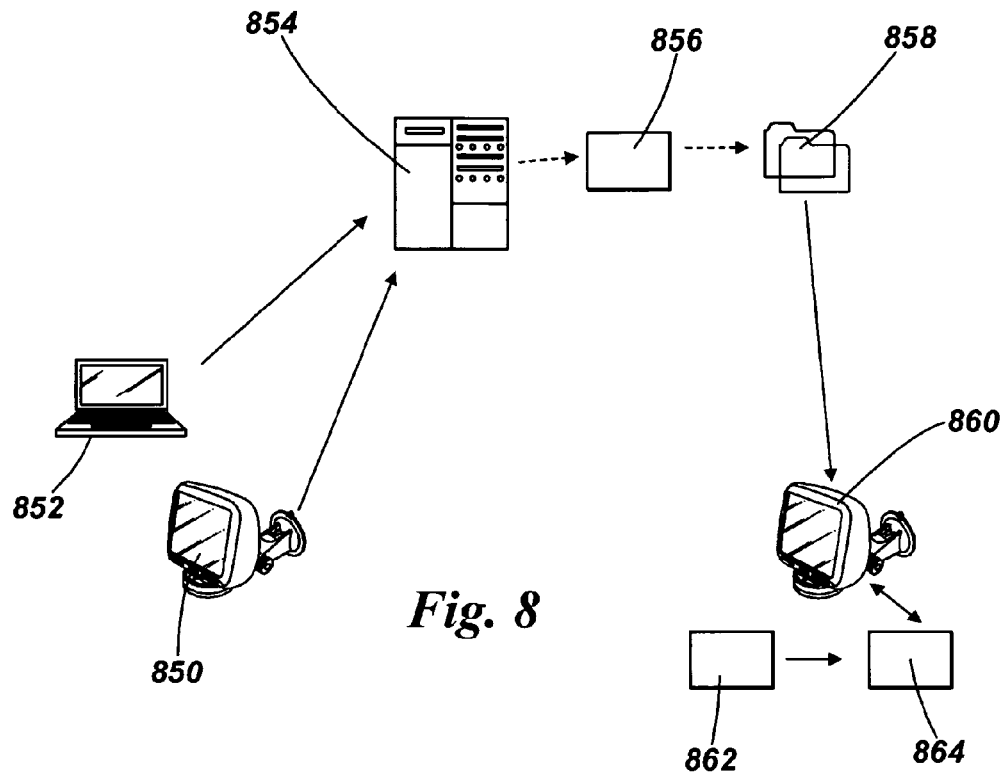
FIG. 8 is a schematic view of a system illustrating embodiments of the invention.

Referring now to FIG. 8 a system illustrating embodiments of the invention is shown. The system comprises an example route navigation device 850, an example route laptop 852, a collection point in the form of a server 854, a cost function generating process 856 forming part of the server 854 for generating a cost function(s) for route planning profile 858, and a user navigation device 860 comprising a memory device 862 and a route planning process 864. It will be appreciated by those skilled in the art that this system is an exemplary implementation of the systems and components described in FIGS. 1-5. Thus, for example, the example route navigation device 850 and the user navigation device 860 may be examples of the GPS receiver 140, server 854 may correspond to server 302, the cost function generating process 856 may be provided by the processor 304 and the route planning process 864 may be provided by the processor 210.

In this example the example route navigation device 850, the example route laptop 852 and the user navigation device 860 are all remote from each other and from the server 854. Communication between each of the example route navigation device 850, the example route laptop 852 and the user navigation device 860 with the server 854 is via a wireless signal network for use of which each device is provided with a wireless transmitter and/or receiver (not shown) as necessary (e.g. transmitter 320 and receiver 322 as discussed in relation to FIG. 3).

In FIG. 8, the route planning profile 858 is representative of many possible route planning profiles for which cost functions have been generated by process 856 at the server 854. Indeed one or more additional cost function generating processes 856 may be provided for the purpose of generating cost functions for one or more additional route planning profiles 858.

The route planning profile 858 has cost functions generated therefore by the cost function generating process 856 utilising example routes identified as relevant to that route planning profile 858.

Example routes are sent to the server 854, for use by the cost function generating process in generating cost functions for the route planning profile 858, from the example route navigation device 850 and the example route laptop 852 using the wireless signal network. It will be appreciated that the example route navigation device 850 and the example route laptop 852 are illustrative only and that many similar additional devices may be used to upload example routes to the server 854.

In this embodiment the example route laptop 852 is provided with software allowing a user of the laptop 852 to create an example route on an electronic map, identify the route planning profile to which the example route is relevant and upload the example route to the server 854.

In this embodiment the example route navigation device 850 is designed and advertised for use by users interested in using a particular route planning profile (e.g. motorcyclists). The example route navigation device 850 is capable of recording routes travelled by the user as example routes (eg by recording the GPS data or location data as the navigation device is moved along the route). These routes as well as an indication that they originate from a route navigation device designed for, or associated for use by, a users belonging to, or associated with, etc. a particular route planning profile are then uploaded to the server 854.

It will be appreciated that rather than the example route navigation device 850 being manufactured for use only by users interested in using a particular route planning profile, it may instead be provided with an explicit route planning profile identification function, whereby a user may indicate the route planning profile to which an example route travelled is relevant. The explicit route planning profile identification function may be entered by a user pressing a button on his/her navigation device (whether that button is a hard or a soft button); using a menu to enter; using a voice command, etc. When providing the explicit route planning profile identification function, the navigation device may record an example route as belonging to the relevant route planning profile, which the user may specify (possibly before, during and/or after the journey is complete). It will be appreciated that other methods of route planning profile identification may be employed such as implicit route planning profile identification according to sensed information about use of the navigation device.

In an alternative, or additional, system, rather than using the example route navigation device 850 to record example routes, functionality may instead be provided for the user to rate a route generated by the example route navigation device 850 for its suitability for a particular route planning profile.

It will further be appreciated that the example route navigation device 850 and the example route laptop 852 are representative of potentially myriad similar devices or identical devices that may be used to upload example routes to the server 854. With increasing numbers of such devices the example route sample size will also likely increase resulting in an improvement in the quality of the route planning profile 858.

Once the route planning profile 858 has cost functions generated therefore it may be downloaded to the user navigation device 860 via the wireless signal network. It will be appreciated that the navigation device 860 is representative of many user navigation devices 860 to which the route planning profile 858 may be downloaded. In this embodiment the user navigation device 860 is designed and advertised for use by users belonging (ie interested in) to a particular route planning profile (e.g. motorcyclists) and so only a route planning profile 858 that is identified as relevant to the route planning profile to which the user belongs, expresses an interest for, etc. is downloaded (only a single route planning profile 858 is provided on the user navigation device 860).

In alternative embodiments however, especially where the user navigation device 860 is capable of using different route planning profiles 858 depending on the instant requirement of the user, multiple route planning profiles 858 may be downloaded to the user navigation device. Where multiple route planning profiles 858 are downloaded the user may be given the option (by means of an explicit identification function) of selecting which route planning profile 858 should be used in the generation of a particular route so as their priorities for a particular journey are catered for. Such identification may for example be performed by entries on an input device 220 such as was discussed in relation to FIG. 2. It will be appreciated that other methods of route planning profile identification may be employed such as implicit route planning profile identification according to sensed information about use of the navigation device (for example recorded using a sensor that may be considered an input output device 280).

When the route planning profile 858 is downloaded to the user navigation device 860 it is stored in the memory device 862 (which may be considered to correspond to memory 230 of FIG. 2), or within a card for use with the device 860 (via card port 228). From there the route planning profile 858 is callable by the route planning process 864 and is therefore used in the generation of a route required by the user.

It will be appreciated that a navigation device may be capable of performing the functions of both the example route navigation device 850 and the user navigation device 860.

In this embodiment the server 854 downloads the route planning profile 858, for which cost function(s) have been generated, periodically (or at least from time to time) to the user navigation device 860. In this way, as the route planning profile 858 is adjusted (by population performed by the cost function generating process 856) in response to newly uploaded example routes, the benefit of the adjusted profile 858 is passed on to the user.

In this embodiment the user navigation device is provided with a route planning profile 858 having cost functions generated therefore during manufacture. This route planning profile 858 is then periodically (or at least from time to time) updated as described above during the course of its life.

Figure 9:
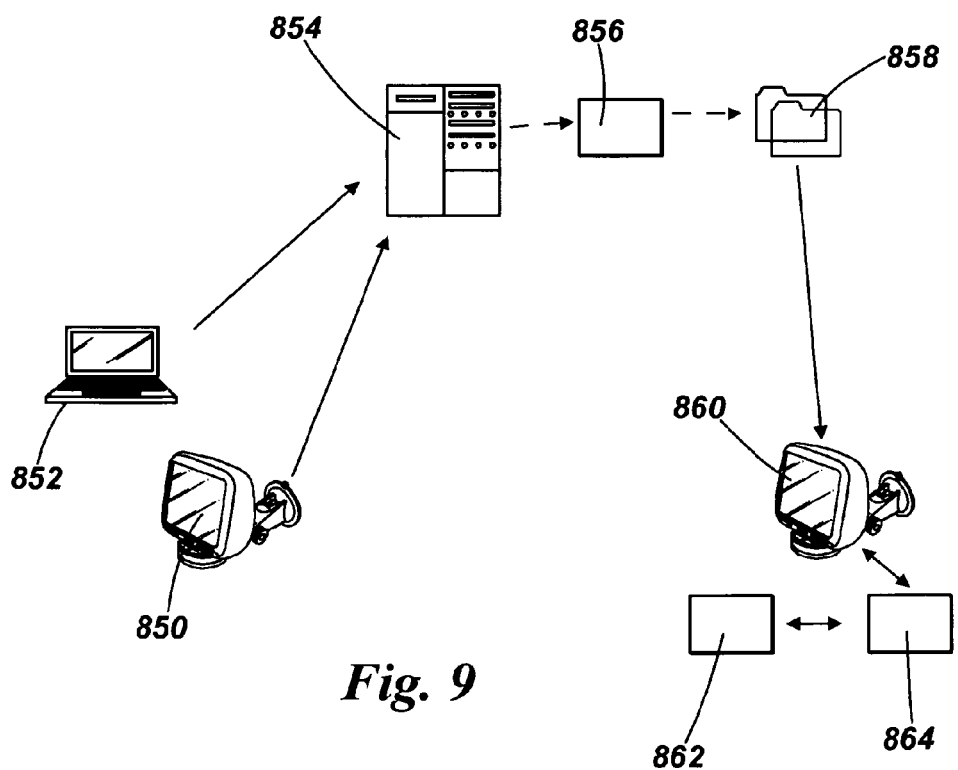
FIG. 9 is another schematic view of a system illustrating embodiments of the invention.

Referring now to FIG. 9 a similar system to that shown in FIG. 8 is provided. In this system however, in addition to the route planning process 864 being arranged to generate a route as required by the user, it is also capable of providing a cost function generating process. In this way, not only can the user navigation device 860 receive a route planning profile 858 from the server 854, but it can also generate cost functions for a route planning profile when stored in the memory device 862 (whether previously received from the server 854 cost function generating process 856 or not). This allows the user to 'teach' his/her own user navigation device 860 or more accurately his/her own route planning profile, based upon example routes recorded by the user navigation device 860 when they are travelled or created by the user. By this adjustment of the cost functions in the route planning profile, the routes generated by the route planning process 864 may be still further tailored to the particular priorities of the user. Such generated route planning profiles generated by a user may or may not subsequently be uploaded to a server, possibly for use by others.

As with the embodiment of FIG. 8, in other embodiments the user navigation device 860 may be provided with more than one route planning profile 858, each of which may be selectively used and in this case selectively have cost functions generated therefore by the route planning process 864 also capable of performing as a cost function generating process.

Figure 10:
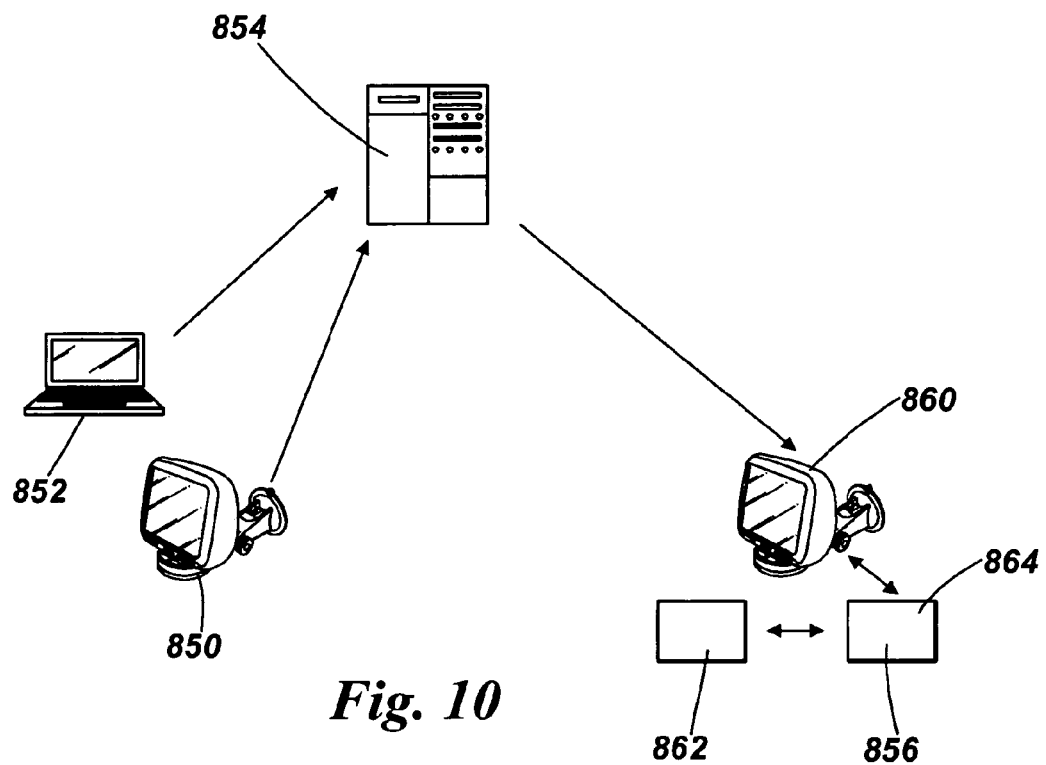
FIG. 10 is another schematic view of a system illustrating embodiments of the invention.

Referring now to FIG. 10 another similar system to that shown in FIGS. 8 and 9 is provided. In this embodiment however the server 854 is not provided with a cost function generating process or route planning profile to generate cost functions. Instead the route planning process 864 of the user navigation device 860 is also capable of performing as a cost function generating process. In this embodiment therefore all route planning profile population is performed at the navigation device level. The server 854 acts as a collection and redistribution hub for example routes uploaded from the example route navigation device 850 and the example route laptop 852.

Figure 11:
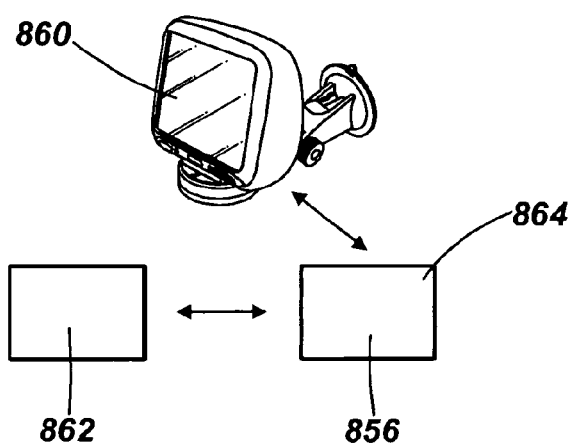
FIG. 11 is another schematic view of a system illustrating embodiments of the invention.

Referring now to FIG. 11, a system is provided whereby example route generation, cost function generation and route planning are performed at the user navigation device 860 level. In this embodiment the route planning process 864 is also capable of recording example routes generated by the user and of performing as a cost function generating process. In this way the user navigation device 860 is a closed system and there is no requirement for communication with a server or other external device.

Turning now to the way in which a cost function generating process generates cost functions for a route planning profile, one method is described with reference to FIGS. 12 and 13. In a first step the cost function generating process maps the example route on an electronic map. The example route is then divided up into one or more segments between the start and end points.

In FIG. 12A an example route initially divided into a single segment 1205 is defined between points A and B (step 1300). The route planning profile for which cost functions are to be generated is then used by a route planning process to generate a route segment 1207, based on its current cost functions, between the end points of the example segment 1205, A and B (step 1302). It will be appreciated that the route segment generated 1207 may be different to the example route segment 1205, and indeed is perhaps likely to be so. If the route planning profile has not previously had cost functions generated therefore (either manually or using example routes) it may have an array of arbitrarily or semi-arbitrarily selected cost functions assigned thereto, or may even be ignored by the route planning process in generating the route segment 1207.

Where the route segment 1207 generated matches the corresponding example route segment 1205 to within a predefined tolerance, this segment is ignored and the next segment is analysed as above.

If however the planned route segment 1207 does not match the corresponding segment 1205 of the example route to within the predefined tolerance, differences between cost functions in the route planning profile to have cost functions generated therefore and those in a constructed route planning profile with cost functions based exclusively on the example route segment 1207 are recorded (step 1304).

The example route segment 1205 is then split into two further segments and the analysis above is repeated (ignore and move on if there is a match, record differences in cost functions and split the example segment again if there is not a match). This can be seen in FIG. 12B and step 1306 where the example route segment 1205 has been split into two segments 1209 and 1211 by point C.

It can further be seen that the route generated between points A and C using the route planning profile to have cost functions generated therefore now matches the example segment 1209 between points A and C. This segment is now ignored and segment 1211 between points C and B is analysed. Here the route generated using the route planning profile does not match the example segment 1211. Cost function differences between the route planning profile to have cost functions generated therefore and those in a constructed route planning profile with cost functions based exclusively on the example route segment 1211 are recorded. The segment 1211 is then split at point D; ie the method loops in step 1308. Now the route segment generated by the route planning profile between points A and B is in complete agreement with the example route segment and the method finishes in step 1310.

Finally, when all segments have been analysed, all recorded cost function differences are analysed and the cost functions associated with features in the route planning profile to have cost functions generated are adjusted, thereby generating a set of cost functions for that route planning profile.

In this way a route planning process of a navigation device (which for example may be the processor 210 of the device shown in FIG. 2) can be used to generate a route for a user to follow which matches the route planning profile that he/she has specified.

Although the above describes the generation of position data from position data from GPS the skilled person will appreciate that such position data may derived from other sources. For example other position data could be processed in a manner similar to the methods as described herein. Thus, term GPS data may be replaceable with the phrase positioning data. Such position information could for example be derived from position information derived from mobile phone operation, data received at toll barriers, data obtained from induction loops embedded in roads, data obtained from number plate recognition system or any other suitable data.

The invention claimed is:

1. A method of generating a route across an electronic map representative of an area using processing circuitry to generate a set of cost functions associated with at least one route planning profile comprising:
   creating information for at least one example route by at least one of: a user categorizing existing information relating to a route as belonging to at least one particular route planning profile, and a user inputting information to create an example route for at least one particular route planning profile; the example route being a route that a user knows to have a predominance of desirable or undesirable features for the particular route planning profile;
   collecting the created information relating to said at least one example route associated with the at least one route planning profile;
   processing the information relating to the at least one example route to generate one or more cost functions to be used with the at least one route planning profile; and
   using the one or more cost functions to generate a route across the electronic map for that route planning profile.

2. The method according to claim 1, wherein generating the one or more cost functions includes modifying cost functions.

3. The method according to claim 1 further comprising generating cost functions for at least one set of route planning profiles.

4. The method according to claim 1, wherein the route planning profile includes a plurality of categories.

5. The method according to claim 1, wherein the collected information relating to the at least one example route is uploaded to a collection point.

6. The method according to claim 1, wherein cost functions are generated by:
   characterising the example route as a set of features;
   comparing the set of features to a set of features associated with the route planning profile for which the cost function is being generated; and
   generating the cost function for the route planning profile with cost functions in view of the features present in the example route.

7. A processing circuit arranged to generate a route across an electronic map representative of an area, the processing circuitry being arranged to:
   create information for at least one example route by at least one of: a user categorizing existing information relating to a route as belonging to at least one particular route planning profile, and a user inputting information to create an example route for at least one particular route planning profile; the example route being a route that a user knows to have a predominance of desirable or undesirable features for the particular route planning profile;
   receive the created information relating to said at least one example route associated with at least one route planning profile;
   process the information relating to the example route to generate one or more cost functions to be used with the at least one route planning profile; and
   use the one or more cost functions to generate a route across the electronic map for the associated route planning profile.

8. The circuitry according to claim 7 further comprising generating cost functions for a plurality of route planning profiles.

9. A processing circuitry arranged to generate at least one set of cost functions to be used in generating a route across an electronic map, wherein the route is generated for a predetermined route planning profile and the processing circuitry is arranged to:
   create information for at least one example route by at least one of: a user categorizing existing information relating to a route as belonging to at least one particular route planning profile, and a user inputting information to create an example route for at least one particular route planning profile; the example route being a route that a user knows to have a predominance of desirable or undesirable features for the particular route planning profile;
   receive the created information relating to said at least one example route associated with the at least one route planning profile;
   process the information relating to the at least one example route to generate one or more cost functions to be used with the at least one route planning profile; and
   store the generated set of cost functions.

* * * * *